(12) United States Patent
Englund et al.

(10) Patent No.: US 12,253,149 B2
(45) Date of Patent: Mar. 18, 2025

(54) DIFFERENTIAL GEAR UNIT, A VEHICLE COMPRISING A DIFFERENTIAL GEAR UNIT, AND A METHOD FOR OPERATING A DIFFERENTIAL GEAR UNIT

(71) Applicants: Ningbo Geely Automobile Research & Development Co., Ltd., Ningbo (CN); Zhejiang Geely Holding Group Co., Ltd., Zhejiang (CN)

(72) Inventors: Fredrik Englund, Trollhättan (SE); Mikael Mohlin, Kungälv (SE)

(73) Assignees: Ningbo Geely Automobile Research & Development Co., Ltd., Ningbo (CN); Zhejiang Geely Holding Group Co., Ltd., Zhejiang (CN)

( * ) Notice: Subject to any disclaimer, the term of this patent is extended or adjusted under 35 U.S.C. 154(b) by 0 days.

(21) Appl. No.: 18/235,811

(22) Filed: Aug. 19, 2023

(65) Prior Publication Data
US 2023/0392675 A1    Dec. 7, 2023

Related U.S. Application Data

(63) Continuation of application No. PCT/CN2022/076353, filed on Feb. 15, 2022.

(30) Foreign Application Priority Data

Feb. 24, 2021 (EP) .................. 21159044

(51) Int. Cl.
*F16H 48/08* (2006.01)
*F16H 48/24* (2006.01)
(Continued)

(52) U.S. Cl.
CPC ............ *F16H 48/08* (2013.01); *F16H 48/24* (2013.01); *F16H 63/3441* (2013.01); *F16H 48/34* (2013.01)

(58) Field of Classification Search
CPC .......... F16H 48/00–2048/246; F16H 63/3416– 3491; B60T 1/005; B60T 1/062
See application file for complete search history.

(56) References Cited

U.S. PATENT DOCUMENTS

| 8,651,991 B1 * | 2/2014 | Sten | ........................ | F16H 48/30 |
| | | | | 475/204 |
| 9,657,828 B2 * | 5/2017 | Larsson | .................. | F16H 48/34 |

(Continued)

FOREIGN PATENT DOCUMENTS

| CN | 106163856 A | 11/2016 |
| CN | 108779821 A | 11/2018 |

(Continued)

OTHER PUBLICATIONS

International Search Report from corresponding International Application No. PCT/CN2022/076353, mailed on May 19, 2022, 2 pages.

*Primary Examiner* — James J Taylor, II
(74) *Attorney, Agent, or Firm* — Tucker Ellis LLP (57) ABSTRACT

A differential gear unit includes an annular ring gear having a rotational axis in an axial direction; side gears respectively distribute torque to drive shafts; differential pinion gears are rotatably arranged on a pinion pin, where the pinion gears respectively engage the side gears. A decoupling element inside the ring gear is rotatably arranged in relation to the ring gear. The pinion pin is connected to and extends diametrically across the decoupling element. A clutch sleeve slides relative to the ring gear and the decoupling element. The clutch sleeve, upon axial displacement, disconnects the ring gear from the decoupling element in a first position, allowing rotational movement of the decoupling element relative to the ring gear; connects the ring gear to the decoupling element in a second position, preventing the (Continued)

rotational movement of the decoupling element; and connects the ring gear to a park-lock structure in a third position.

14 Claims, 6 Drawing Sheets

(51) Int. Cl.
  *F16H 48/34*   (2012.01)
  *F16H 63/34*   (2006.01)

(56) References Cited

U.S. PATENT DOCUMENTS

| | | | |
|---|---|---|---|
| 11,845,330 B2 * | 12/2023 | Yoo | ................. B60K 17/08 |
| 2002/0155913 A1 | 10/2002 | Fusegi | |
| 2009/0192007 A1 | 7/2009 | Sudou | |
| 2012/0264559 A1 | 10/2012 | Mayr | |
| 2017/0234428 A1 | 8/2017 | Spooner | |
| 2019/0055997 A1 | 2/2019 | Inose | |

FOREIGN PATENT DOCUMENTS

| | | | | |
|---|---|---|---|---|
| CN | 109690110 A | 4/2019 | | |
| CN | 111527320 A | 8/2020 | | |
| DE | 102011088669 A1 * | 6/2013 | ......... | F16H 63/304 |
| DE | 102017115256 A1 | 1/2018 | | |
| JP | 2020133775 A | 8/2020 | | |
| WO | 2015078488 A1 | 6/2015 | | |
| WO | 2020143921 A1 | 7/2020 | | |

\* cited by examiner

DIFFERENTIAL GEAR UNIT, A VEHICLE COMPRISING A DIFFERENTIAL GEAR UNIT, AND A METHOD FOR OPERATING A DIFFERENTIAL GEAR UNIT

RELATED APPLICATION DATA

This application is a continuation of International Patent Application No. PCT/CN2022/076353, filed Jan. 15, 2022, which claims the benefit of European Patent Application No. 21159044.3, filed Feb. 24, 2021, the disclosures of which are incorporated herein by reference in their entireties.

TECHNICAL FIELD

The present disclosure relates to a differential gear unit for a vehicle. The differential gear unit comprises an annular ring gear arranged to rotate around a rotational axis extending in an axial direction. A first side gear is configured for distributing a first output torque to a first drive shaft, and a second side gear is configured for distributing a second output torque to a second drive shaft. At least a first differential pinion gear and a second differential pinion gear are rotatably arranged on a pinion pin, and the at least first differential pinion gear and second differential pinion gear are configured for engaging the first side gear and the second side gear. The disclosure further relates to a vehicle comprising a differential gear unit and a method for operating a differential gear unit.

BACKGROUND

Differential gear units are commonly used in vehicle applications for transferring torque from a rotating input drive shaft to axles and wheels of a vehicle. Differential gear units may also be used for torque distribution between front wheels and rear wheels in four-wheel drive systems. The rotating input drive shaft is traditionally engaging a ring gear connected to a differential housing, and the differential gear unit is arranged to transfer torque from the input drive shaft to output drive shafts via the ring gear, differential pinion gears and side gears. Typically, a pair of side gears are directly attached to the output drive shafts, and a pair of differential pinion gears are interconnecting the side gears. The differential pinion gears are supported by a pinion pin, which normally extends across the differential housing. The differential pinion gears are allowed to rotate on the pinion pin, which in turn is allowing the vehicle output drive shafts to rotate relative one another. The rotational load is transferred from the input drive shaft, to the ring gear, through the differential housing and to the pinion pin.

In certain driving conditions, there is a demand to decouple the drivetrain torque from the wheels, with the aim for the wheels to free roll with a minimum of resistance. Traditional differential gear units are made robust and non-flexible in construction to support the load being transferred through the housing structure, and therefore the decoupling of the drivetrain torque is normally applied in the transmission. During the decoupling of the transmission, one or more gear pairs are driven by the drive shafts, which generate transmission losses in the gear contact, rotating shafts, bearings, and oil flow. Often, there is a requirement to have a mechanical park-lock mechanism integrated in the transmission, which automatically blocks the rotation when a gear selector is set to a park position. The configurations of traditional transmissions with torque decoupling and park-lock mechanism generate losses, add overall length, and make the construction of the drivetrain complex and costly. There is thus a need for an improved drivetrain configuration, which is more simple, compact and efficient.

SUMMARY

An object of the present disclosure is to provide a differential gear unit, a vehicle comprising a differential gear unit, and a method for operating a differential gear unit, where the previously mentioned problems are avoided. This object is at least partly achieved by the features of the independent claims. The dependent claims contain further developments of the differential gear unit and the method for operating a differential gear unit.

The disclosure concerns a differential gear unit for a vehicle, where the differential gear unit comprises: an annular ring gear arranged to rotate around a rotational axis extending in an axial direction; a first side gear configured for distributing a first output torque to a first drive shaft, and a second side gear configured for distributing a second output torque to a second drive shaft; at least a first differential pinion gear and a second differential pinion gear rotatably arranged on a pinion pin, where the at least first differential pinion gear and second differential pinion gear are configured for engaging the first side gear and the second side gear. The differential gear unit further comprises a decoupling element arranged radially inside the ring gear, where the decoupling element is rotatably arranged in relation to the ring gear. The pinion pin is connected to and extending diametrically across the decoupling element. The differential gear unit further comprises a clutch sleeve slidably arranged relative to the ring gear and the decoupling element in the axial direction. The clutch sleeve is upon displacement in the axial direction configured for: disconnecting the ring gear from the decoupling element in a first axial position, allowing rotational movement of the decoupling element relative to the ring gear; connecting the ring gear to the decoupling element in a second axial position, preventing rotational movement of the decoupling element relative to the ring gear; and connecting the ring gear to a park-lock structure in a third axial position.

Advantages with these features are that the drivetrain is improved with a more simple, compact and efficient configuration through the design of the differential gear unit. The differential gear unit is providing flexibility in the operation of the drivetrain through the arrangement of the decoupling element and clutch sleeve, where the clutch sleeve upon displacement in the axial direction is configured for: disconnecting the ring gear from the decoupling element in the first axial position, connecting the ring gear to the decoupling element in the second axial position, and connecting the ring gear to a park-lock structure in a third axial position. The differential gear unit is simple and flexible in construction through the arrangement with the decoupling element and clutch sleeve. With the configuration described, there is no need to decouple the drivetrain torque from the wheels in the transmission, or to integrate the park-lock mechanism in the transmission. With the differential gear unit, the wheels can free roll with a minimum of resistance in the first axial position, and transmission losses in the gear contact, rotating shafts, bearings, and oil flow can be minimized. In the second axial position, torque can be efficiently transferred to the wheels of the vehicle. In the third axial position, a secure park-lock functionality is achieved. Further, the differential gear unit is making the construction of the drivetrain less complex and less costly.

According to an aspect of the disclosure, the clutch sleeve is in the third axial position configured for connecting the ring gear to the park-lock structure and the decoupling element, preventing rotational movement of the decoupling element relative to the ring gear and rotational movement of the ring gear relative to the park-lock structure. With this configuration of the third axial position, an efficient park-lock functionality is achieved, where the decoupling element is prevented from moving in relation to the ring gear and where the clutch sleeve is in engagement with the park-lock structure. The clutch sleeve is designed to prevent rotational movement of the ring gear relative to the park-lock structure in the third axial position for an efficient park-lock functionality, preventing the wheels of the vehicle from rotating.

According to another aspect of the disclosure, the ring gear comprises a hub structure. The decoupling element is arranged radially inside the hub structure and rotatably arranged in relation to an internal surface of the hub structure. The hub structure is used for an efficient arrangement of parts of the differential gear unit for a compact design.

According to an aspect of the disclosure, the clutch sleeve comprises a sleeve body with a first toothed surface, where the first toothed surface is arranged on a radially inner surface of the sleeve body. The decoupling element comprises a radially outer toothed surface configured for being disengaged from the first toothed surface in the first axial position, and engaging the first toothed surface in the second axial position and third axial position. The toothed surfaces are used for efficient engagement and disengagement operations of the differential gear unit. The toothed surfaces are suitably arranged with tooth elements that are configured for engaging each other in the second axial position and third axial position for efficient torque transfer.

According to another aspect of the disclosure, the sleeve body comprises a second toothed surface, where the second toothed surface is arranged on a radially outer surface of the sleeve body. The park-lock structure comprises a toothed area configured for being disengaged from the second toothed surface in the first axial position and second axial position, and engaging the second toothed surface in the third axial position. The toothed surface and toothed area are used for efficient engagement and disengagement operations of the differential gear unit. The toothed surface and toothed area are suitably arranged with tooth elements that are configured for engaging each other in the third axial position for an efficient park-lock functionality.

According to a further aspect of the disclosure, the sleeve body is arranged radially outside the hub structure. The configuration with the sleeve body radially outside the hub structure is providing a compact and flexible design of the differential gear unit.

According to an aspect of the disclosure, the decoupling element has a collar-like configuration, and the clutch sleeve has a collar-like configuration. The collar-like configurations are used for a compact and flexible design, where the parts can interact efficiently with other parts of the differential gear unit.

According to another aspect of the disclosure, the hub structure comprises one or more grooves extending in the axial direction, where the one or more grooves are configured for receiving one or more radially protruding tooth elements of the first toothed surface. The one or more radially protruding tooth elements are through engagement with the one or more grooves configured for preventing rotational movement of the clutch sleeve relative to the hub structure. The one or more radially protruding tooth elements are configured for engaging the radially outer toothed surface in the second axial position and third axial position for an efficient operation of the differential gear unit.

According to a further aspect of the disclosure, the park-lock structure has a ring-like or arc-like configuration, where the park-lock structure is arranged radially outside the hub structure. The park-lock structure is connected to a differential housing. The ring-like or arc-like configurations are used for a compact and robust design, where the parts can interact efficiently with other parts of the differential gear unit for a secure park-locking functionality.

According to an aspect of the disclosure, the side gears and the at least first differential pinion gear and second differential pinion gear are positioned radially inside the decoupling element. The decoupling element is via the at least first differential pinion gear and second differential pinion gear configured for transferring input torque from the ring gear to the first side gear and second side gear. This configuration is providing a compact design of the differential gear unit as well as good torque transferring properties.

According to another aspect of the disclosure, the differential gear unit further comprises an actuating unit in engagement with the clutch sleeve. The actuating unit is adapted for displacing the clutch sleeve relative to the ring gear and the decoupling element, in the axial direction, between the first axial position, the second axial position, and the third axial position. The actuating unit is used for a reliable and secure positioning of the clutch sleeve in the axial direction relative to the ring gear and the decoupling element.

The disclosure further concerns a vehicle comprising a differential gear unit as described above.

The disclosure further concerns a method for operating a differential gear unit for a vehicle. The differential gear unit comprises: an annular ring gear arranged to rotate around a rotational axis extending in an axial direction; a first side gear configured for distributing a first output torque to a first drive shaft, and a second side gear configured for distributing a second output torque to a second drive shaft; at least a first differential pinion gear and a second differential pinion gear rotatably arranged on a pinion pin, where the at least first differential pinion gear and second differential pinion gear are configured for engaging the first side gear and the second side gear. The differential gear unit further comprises a decoupling element arranged radially inside the ring gear, where the decoupling element is rotatably arranged in relation to the ring gear. The pinion pin is connected to and extending diametrically across the decoupling element. The differential gear unit further comprises a clutch sleeve slidably arranged relative to the ring gear and the decoupling element, in the axial direction. The method comprises the steps: displacing the clutch sleeve in the axial direction to a first axial position for disconnecting the ring gear from the decoupling element, where in the first axial position rotational movement of the decoupling element relative to the ring gear is allowed; displacing the clutch sleeve in the axial direction to a second axial position for connecting the ring gear to the decoupling element, where in the second axial position rotational movement of the decoupling element relative to the ring gear is prevented; displacing the clutch sleeve in the axial direction to a third axial position for connecting the ring gear to a park-lock structure.

Advantages with these features are that the differential gear unit is efficiently operated between the different axial positions. The differential gear unit is providing flexibility in the operation of the drivetrain through the arrangement of the decoupling element and the clutch sleeve, where the clutch sleeve upon displacement in the axial direction is configured for operating the differential gear unit in different operating modes. The differential gear unit is simple and flexible in construction through the arrangement with the decoupling element and clutch sleeve. With the configuration described, there is no need to decouple the drivetrain torque from the wheels in the transmission, or to integrate the park-lock mechanism in the transmission. With the differential gear unit, the wheels can free roll with a minimum of resistance in the first axial position, and transmission losses in the gear contact, rotating shafts, bearings, and oil flow can be minimized. In the second axial position, torque can be efficiently transferred to the wheels of the vehicle. In the third axial position, a secure park-lock functionality is achieved.

According to an aspect of the disclosure, the method further comprises the step: connecting the ring gear to the park-lock structure and the decoupling element with the clutch sleeve in the third axial position for preventing rotational movement of the decoupling element relative to the ring gear and rotational movement of the ring gear relative to the park-lock structure. In the third axial position, an efficient park-lock functionality is achieved, where the decoupling element is prevented from moving in relation to the ring gear and the clutch sleeve is in engagement with the park-lock structure. The clutch sleeve is designed to prevent rotational movement of the ring gear relative to the park-lock structure in the third axial position for an efficient park-lock functionality, preventing the wheels of the vehicle from rotating.

According to another aspect of the disclosure, the differential gear unit further comprises an actuating unit in engagement with the clutch sleeve. The method further comprises the step: displacing the clutch sleeve relative to the ring gear and the decoupling element in the axial direction with the actuating unit. The actuating unit is used for a reliable and secure positioning of the clutch sleeve in the axial direction relative to the ring gear and the decoupling element.

BRIEF DESCRIPTION OF THE DRAWINGS

The disclosure will be described in detail in the following, with reference to the attached drawings, in which.

DETAILED DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

FIGS. 1, 2A-2B, and 3A-3C schematically show a differential gear unit 1 for a vehicle according to a first embodiment, and FIGS. 4, 5A-5B, and 6A-6C schematically show a differential gear unit 1 for a vehicle according to an alternative embodiment. The differential gear unit 1 of the respective illustrated embodiments comprise an annular ring gear 2 arranged to rotate around a rotational axis A extending in an axial direction DA. The ring gear 2 comprises an external surface 2c, and a hub structure 2a with an internal surface 2b. The external surface 2c is arranged as a toothed surface for driving engagement with a non-illustrated rotating input drive shaft, where the toothed surface of the ring gear 2 is meshing with a toothed surface of for example an input drive shaft pinion gear. In alternative non-illustrated embodiments, the toothed surface may instead be arranged on other parts of the ring gear 2.

The differential gear unit 1 of the illustrated embodiments further comprises side gears and differential pinion gears of the bevel gear type. A first side gear 3a is configured for distributing a first output torque $T_{O1}$ to a first drive shaft $S_1$, and a second side gear 3b is configured for distributing a second output torque $T_{O2}$ to a second drive shaft $S_2$. The first side gear 3a and the second side gear 3b are arranged on opposite sides of the ring gear 2 in the axial direction DA. At least a first differential pinion gear 4a and a second differential pinion gear 4b are configured for engaging the first side gear 3a and the second side gear 3b, and in the embodiments illustrated in FIGS. 1, 2A-2B, 3A-3C, 4, 5A-5B, and 6A-6C, the differential gear unit 1 comprises two differential pinion gears. However, the differential gear unit 1 may instead be arranged with three or more differential pinion gears. The differential pinion gears are as illustrated in the figures in a conventional manner arranged with toothed surfaces that are engaging toothed surfaces of the side gears. The first differential pinion gear 4a and the second differential pinion gear 4b are rotatably arranged on a pinion pin 5, and the differential pinion gears are configured for transferring torque from the ring gear 2 to the side gears.

The differential gear unit 1 further comprises a decoupling element 6 arranged radially inside the ring gear 2, as illustrated in for example FIGS. 3A-3C and 6A-6C. The decoupling element 6 is rotatably arranged in relation to the ring gear 2, and the pinion pin 5 is connected to and extending diametrically across the decoupling element 6. The decoupling element 6 has in the illustrated embodiments a collar-like configuration. The decoupling element 6 is at least partly arranged radially inside the hub structure 2a of the ring gear 2, and an outer surface 6a of the decoupling element 6 is rotatably arranged in relation to the internal surface 2b of the ring gear 2. One or more inner bearings 14 may be arranged between the outer surface 6a of the decoupling element 6 and the internal surface 2b of the ring gear 2, as schematically illustrated in for example FIGS. 1 and 4. The pinion pin 5 is depending on operational states of the differential gear unit 1 arranged for transferring torque from the ring gear 2 to the respective differential pinion gears, as will be further described below. Upon rotation of the ring gear 2 by for example the input drive shaft pinion gear, the pinion pin 5 could through the attachment to the decoupling element 6, and the arrangement of the decoupling element 6 in relation to the ring gear 2, be arranged to rotate with the ring gear 2, depending on the operational state of the differential gear unit 1. The rotational movement of the pinion pin 5 with the ring gear 2 via the decoupling element 6 is used for transferring the torque to the first side gear 3a and the second side gear 3b via the first differential pinion gear 4a and the second differential pinion gear 4b. With the configuration of the differential gear unit 1, the side gears and the differential pinion gears are positioned radially inside the ring gear 2, as indicated in for example FIGS. 2A-2B and 5A-5B. The pinion pin 5 is thus configured for transferring an input torque $T_1$ from the ring gear 2 to the side gears via the differential pinion gears.

The decoupling element 6 comprises diametrically opposite openings 6c for holding the pinion pin 5 in position relative to the decoupling element 6. With this arrangement, the pinion pin 5 is positioned diametrically across the decoupling element 6, as understood from for example FIGS. 1, 2A-2B, 4 and 5A-5B. Instead of the openings 6c, the decoupling element 6 may be arranged with slots or similar arrangements for holding the pinion pin 5.

The differential gear unit 1 further comprises a clutch sleeve 7 slidably arranged relative to the ring gear 2 and the decoupling element 6 in the axial direction DA. With this configuration, the clutch sleeve 7 is allowed to slide axially in different operational positions in relation to the ring gear 2 and the decoupling element 6. Upon displacement in the axial direction DA, the clutch sleeve 7 is configured for being positioned in a first axial position $P_{A1}$, a second axial position $P_{A2}$, and a third axial position $P_{A3}$. In the embodiments illustrated in FIGS. 1, 2A-2B, 3A-3C, 4, 5A-5B, and 6A-6C, the clutch sleeve 7 has a collar-like configuration. It should however be understood that the clutch sleeve 7 may have other suitable shapes and configurations. The differential gear unit 1 further comprises an actuating unit 9 in engagement with the clutch sleeve 7. The actuating unit 9 is used for displacing the clutch sleeve 7 relative to the ring gear 2 and the decoupling element 6 in the axial direction DA, and the actuating unit 9 is suitably connected to a control unit 13 for operating the differential gear unit 9 into the different axial positions, as schematically shown in FIGS. 3A-3C and 6A-6C. The actuating unit 9 may be of any suitable type, such as for example a linear actuator, a solenoid, or an electric motor.

Figure 3A:
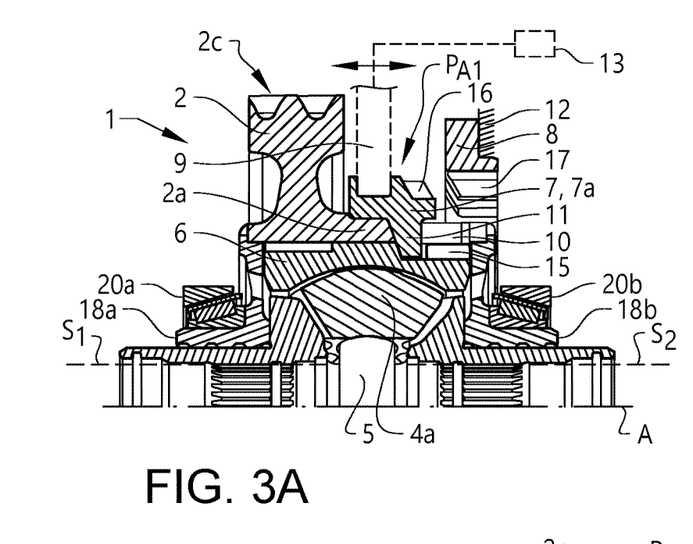
FIG. 3A-3C show schematically in cross-sectional views, the differential gear unit in different operating positions according to the disclosure.
Figure 3B:
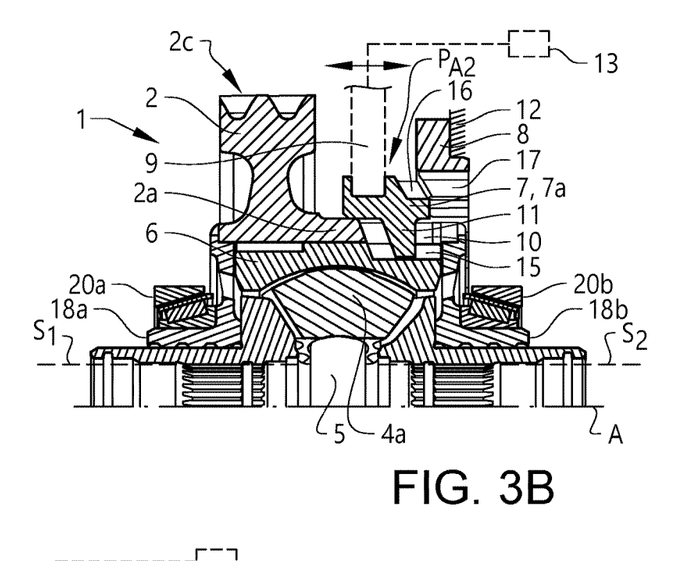
Figure 3C:
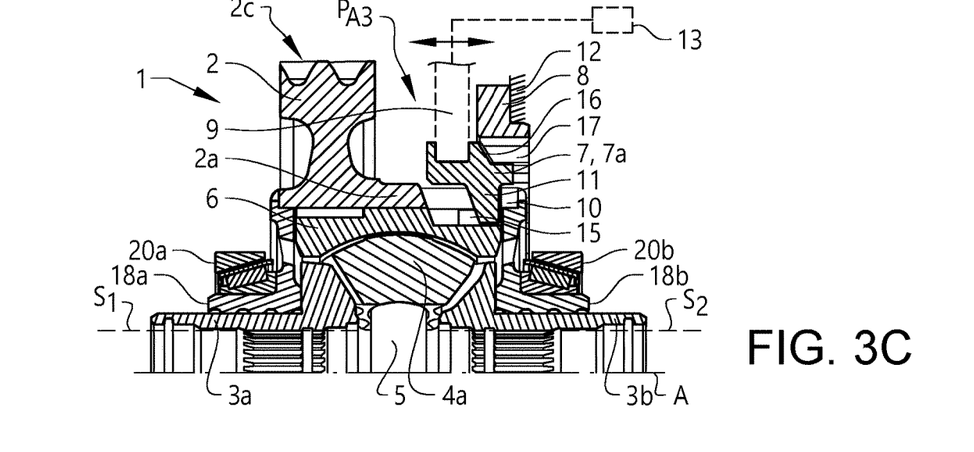
Figure 6A:
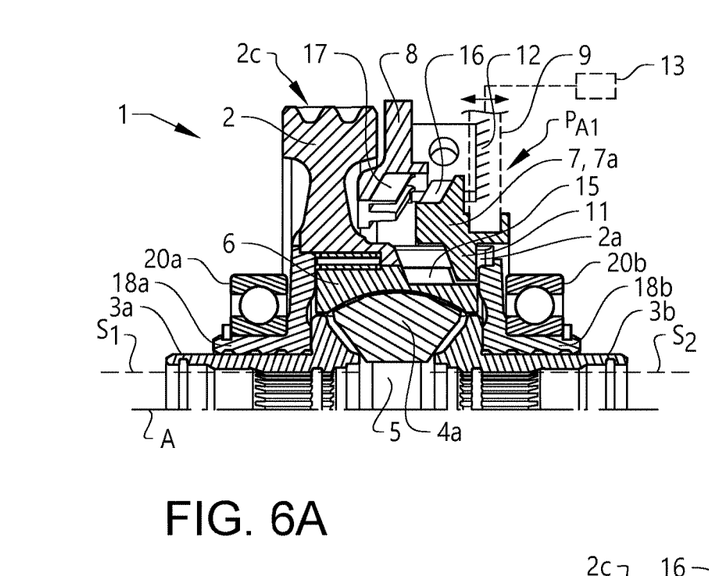
FIG. 6A-6C show schematically in cross-sectional views, the differential gear unit in different operating positions according to the alternative embodiment of the disclosure.
Figure 6B:
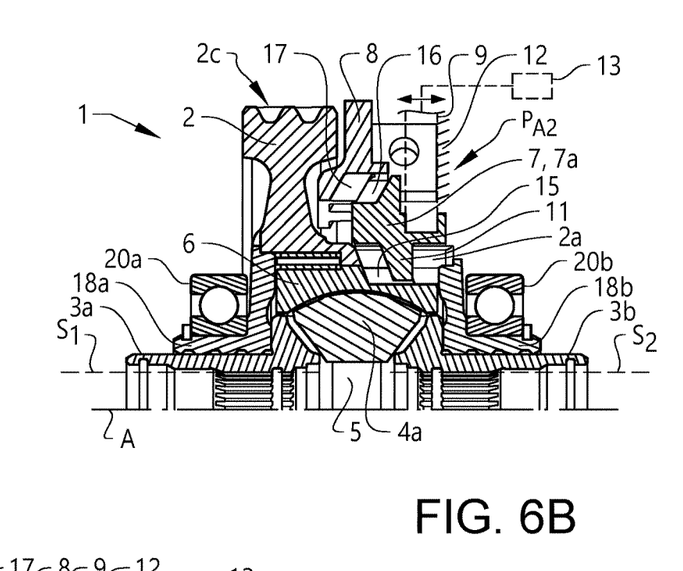
Figure 6C:
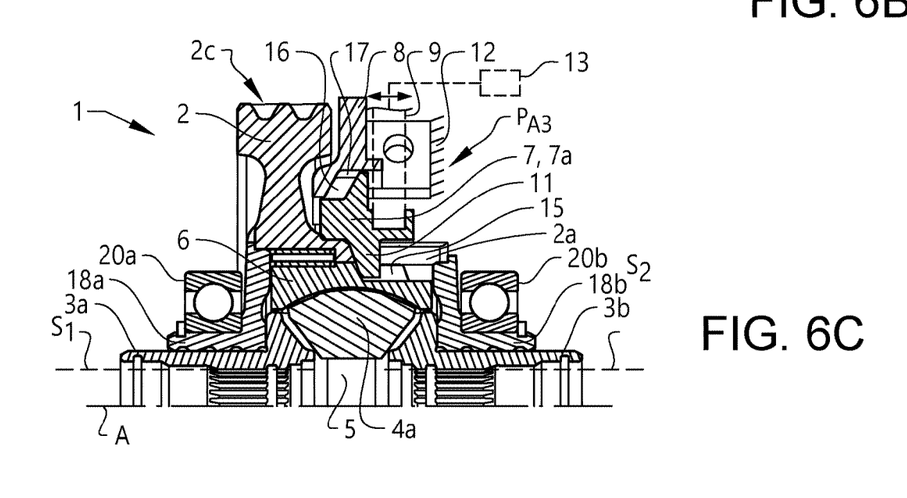

Different axial positions of the clutch sleeve are schematically illustrated in FIGS. 3A-3C and 6A-6C. In a first axial position $P_{A1}$, as illustrated in FIGS. 3A and 6A, the ring gear 2 is disconnected from the decoupling element 6, and in the first axial position $P_{A1}$ rotational movement of the decoupling element 6 relative to the ring gear 2 is allowed. In a second axial position $P_{A2}$, as illustrated in FIGS. 3B and 6B, the ring gear 2 is connected to the decoupling element 6, and in the second axial position $P_{A2}$ rotational movement of the decoupling element 6 relative to the ring gear 2 is prevented. In a third axial position $P_{A3}$, as illustrated in FIGS. 3C and 6C, the ring gear 2 is connected to a park-lock structure 8, and in the third axial position $P_{A3}$, the ring gear is prevented from rotating relative to the park-lock structure 8.

In the embodiments illustrated in FIGS. 3C and 6C, the clutch sleeve 7 is in the third axial position $P_{A3}$ not only configured for connecting the ring gear 2 to the park-lock structure 8, but also configured for simultaneously connecting the ring gear 2 to the decoupling element 6. This configuration prevents rotational movement of the decoupling element 6 relative to the ring gear 2, and rotational movement of the ring gear 2 relative to the park-lock structure 8. Thus, both the decoupling element 6 and the ring gear 2 are prevented from rotating relative to the park-lock structure 8 for an efficient park-locking function, where the wheels of the vehicle are prevented from rotating.

Figure 1:
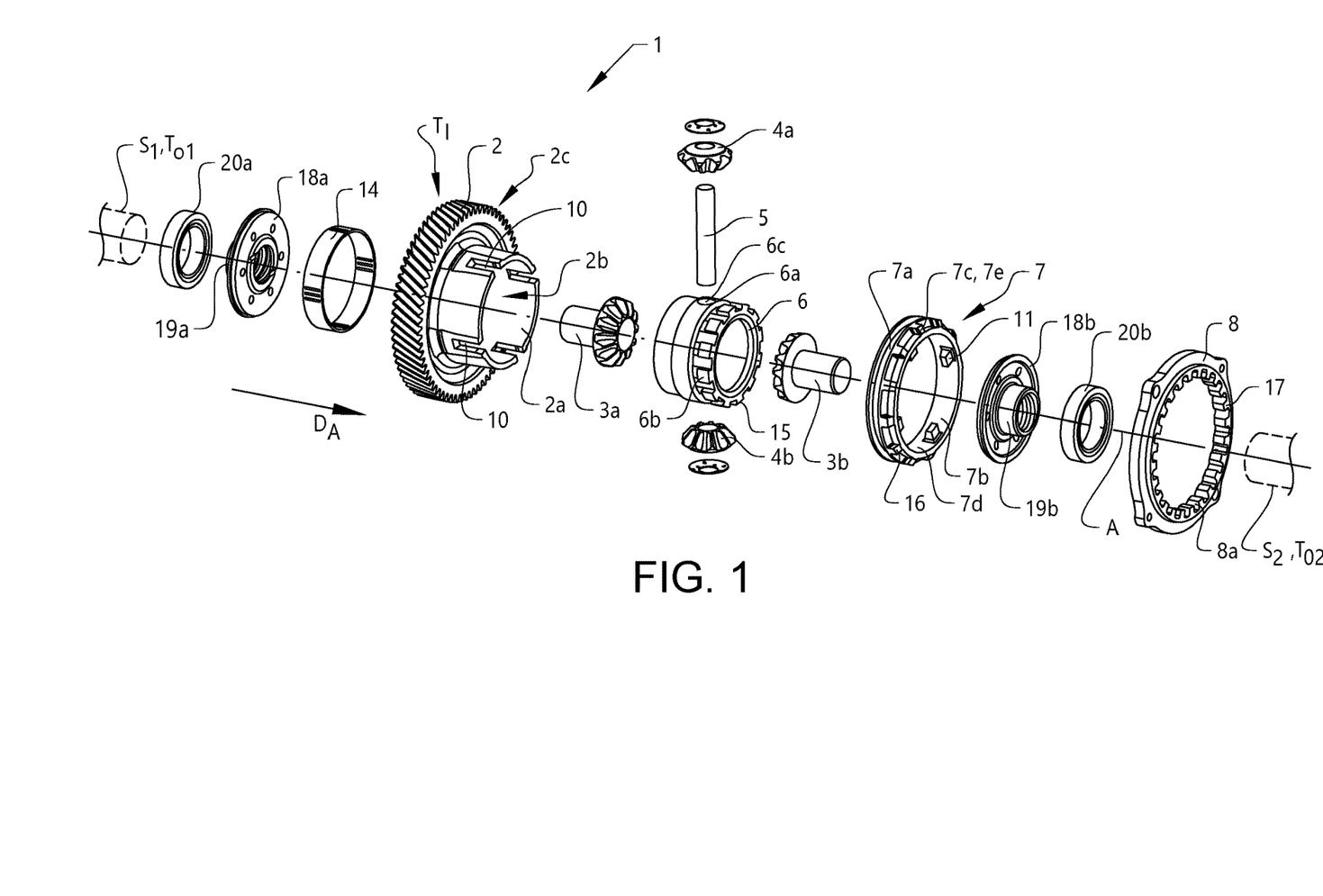
FIG. 1 shows schematically in an exploded perspective view, a differential gear unit according to the disclosure.
Figure 2A:
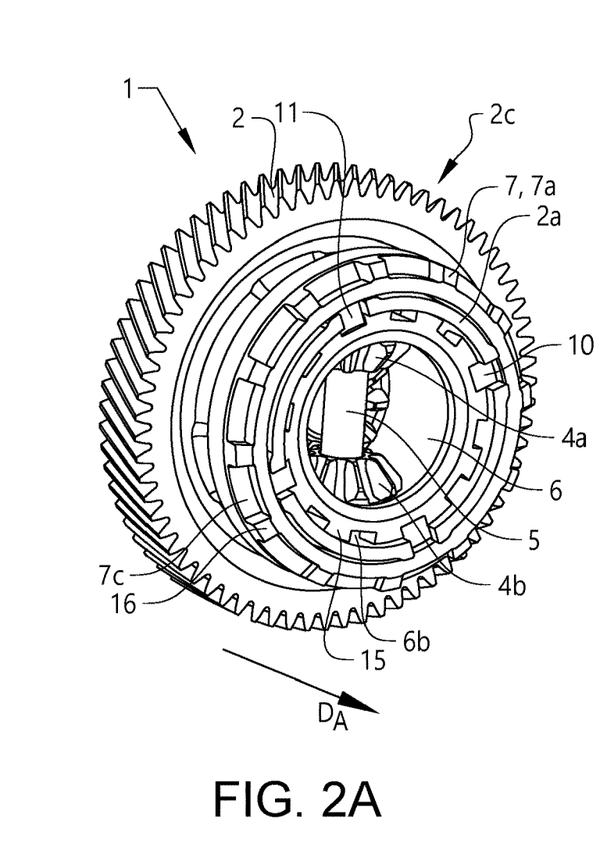
FIG. 2A-2B show schematically in perspective views, the differential gear unit according to the disclosure.
Figure 2B:
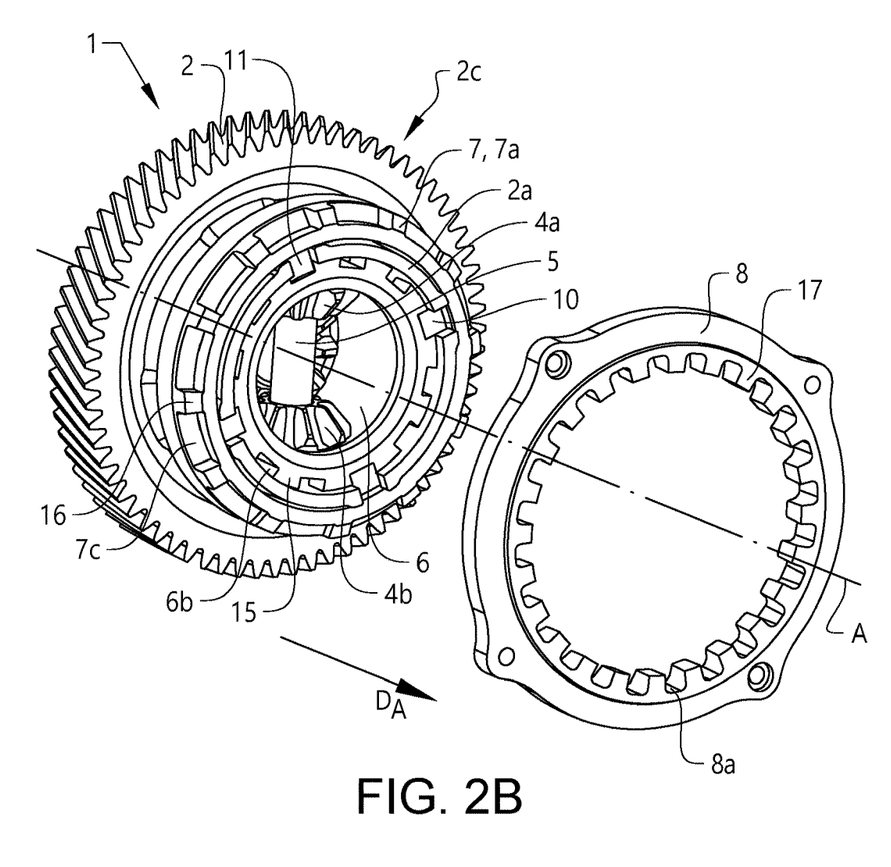
Figure 4:
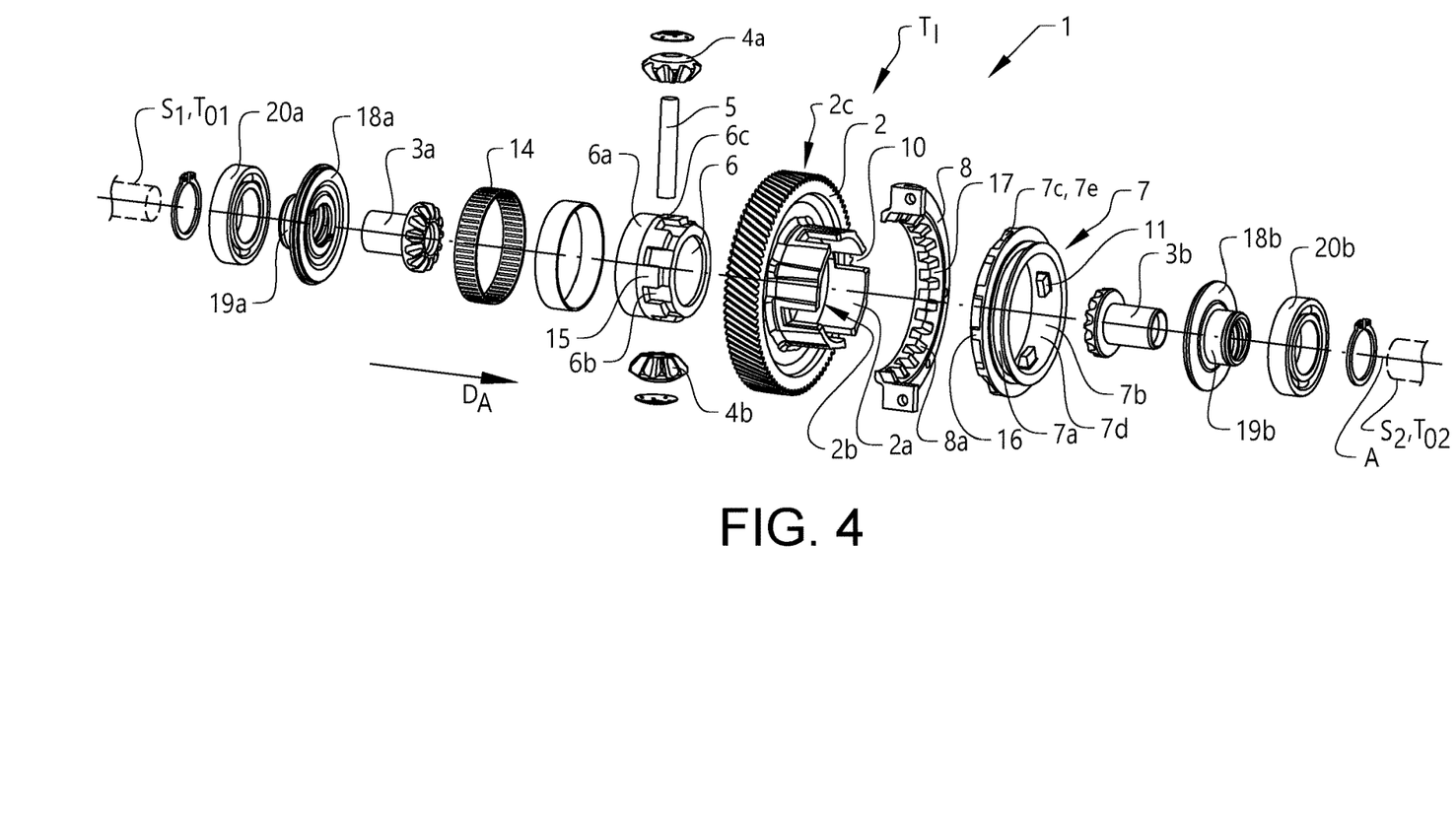
FIG. 4 shows schematically in an exploded perspective view, a differential gear unit according to an alternative embodiment of the disclosure.
Figure 5A:
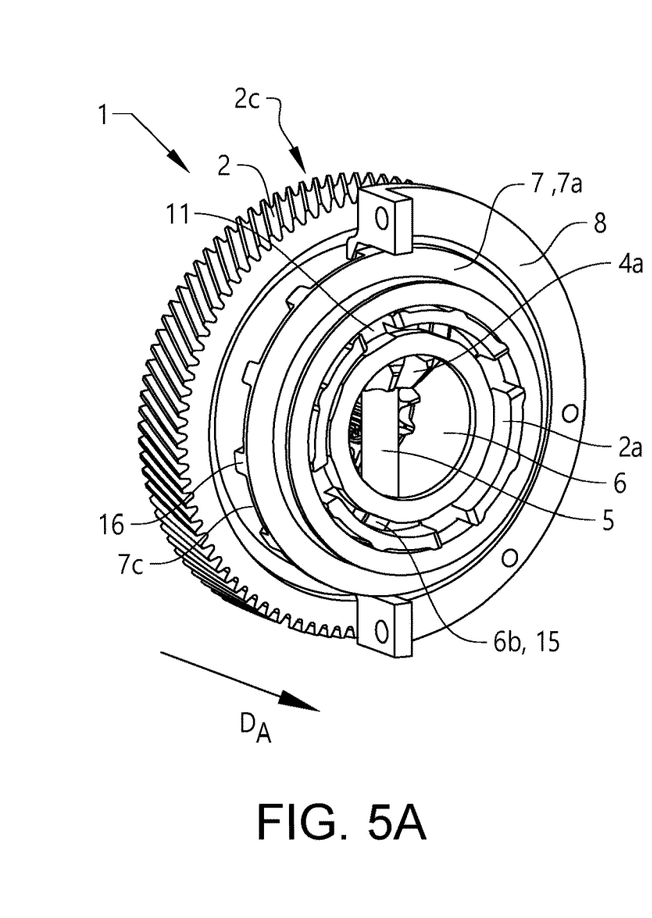
FIG. 5A-5B show schematically in perspective views, the differential gear unit according to the alternative embodiment of the disclosure.
Figure 5B:
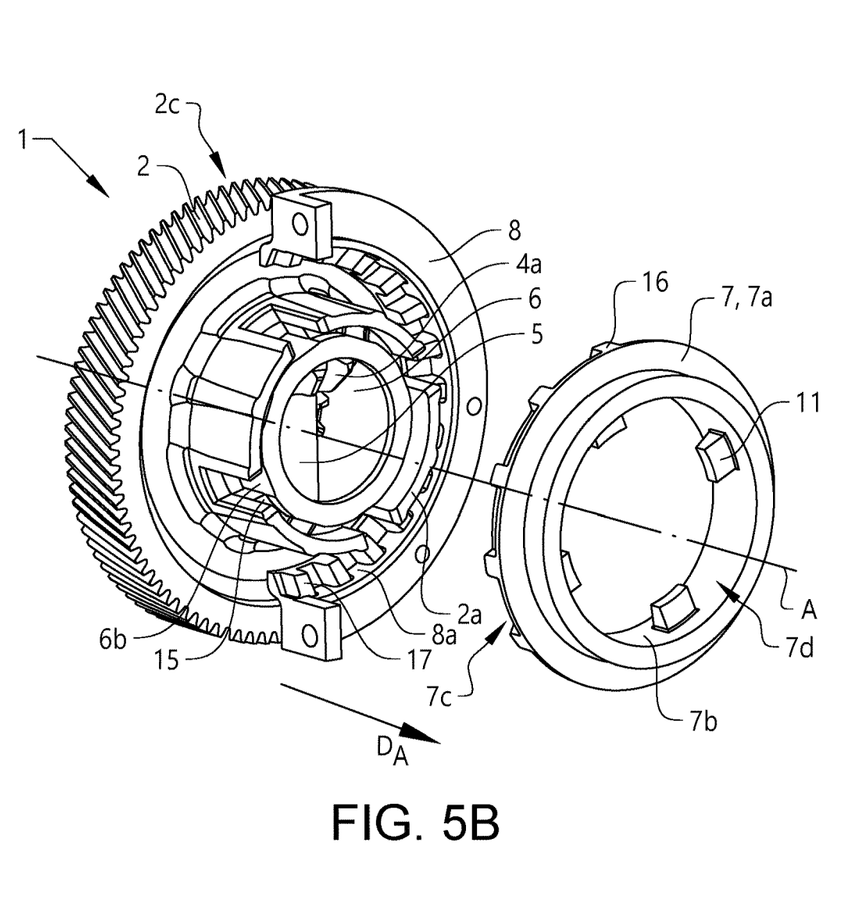

The clutch sleeve 7 comprises a sleeve body 7a with a first toothed surface 7b, as shown in for example FIGS. 1 and 4. The clutch sleeve 7 has in the illustrated embodiments a collar-like configuration and the sleeve body 7a is arranged radially outside the hub structure 2a, as understood from FIGS. 3A-3C and 6A-6C. The first toothed surface 7b is arranged on a radially inner surface 7d of the sleeve body 7a.

The hub structure 2a comprises one or more grooves 10 extending in the axial direction DA. The one or more grooves 10 are configured for receiving one or more radially protruding tooth elements 11 of the first toothed surface 7b. As understood from FIGS. 3A-3C and 6A-6C, the radially protruding tooth elements 11 are through engagement with the grooves 10 configured for preventing rotational movement of the clutch sleeve 7 relative the hub structure 2a. The decoupling element 6 comprises a radially outer toothed surface 6b with one or more radially protruding tooth elements 15, as shown in for example FIGS. 1 and 4. The one or more radially protruding tooth elements 11 of the first toothed surface 7b are further configured for engaging the one or more radially protruding tooth elements 15 of the radially outer toothed surface 6b in the second axial position $P_{A2}$ and third axial position $P_{A3}$. The decoupling element 6 may be provided with a track, a groove, or similar arrangement for the tooth elements 11 of the first toothed surface 7b, preventing the tooth elements 11 from engaging the decoupling element 6 in the first axial position $P_{A1}$, allowing the decoupling element 6 to rotate relative to the ring gear 2.

The radially outer toothed surface 6b and the first toothed surface 7b are disengaged from each other in the first axial position $P_{A1}$, as shown in FIGS. 3A and 6A. When the radially outer toothed surface 6b and the first toothed surface 7b are disengaged from each other in the first axial position $P_{A1}$, the decoupling element 6 is free to rotate relative to the ring gear 2 and torque is prevented from being transferred from the ring gear 2 to the differential pinion gears via the decoupling element 6. The radially outer toothed surface 6b and the first toothed surface 7b are in engagement with each other in the second axial position $P_{A2}$ and in the third axial position $P_{A3}$ via the radially protruding tooth elements 11 of the first toothed surface 7b and the radially protruding tooth elements 15 of the radially outer toothed surface 6b, as shown in FIGS. 3B-3C and 6B-6C. When the radially outer toothed surface 6b and the first toothed surface 7b are in engagement with each other in the second and third axial positions, the rotational movement of the decoupling element 6 relative to the ring gear 2 is prevented and torque can be transferred from the ring gear 2 to the differential pinion gears and the side gears via the decoupling element 6.

The sleeve body 7a further comprises a second toothed surface 7c with one or more protruding tooth elements 16, as shown in for example FIGS. 1 and 4. The second toothed surface 7c is arranged on a radially outer surface 7e of the sleeve body 7a. The park-lock structure 8 comprises a toothed area 8a with one or more protruding tooth elements 17, as shown in for example FIGS. 1 and 4. The second toothed surface 7c and the toothed area 8a are disengaged from each other in the first axial position $P_{A1}$ and in the second axial position $P_{A2}$, as shown in FIGS. 3A-3B and 6A-6B. When the second toothed surface 7c and the toothed area 8 are disengaged from each other in the first and second axial positions, the ring gear 2 is free to rotate relative to the park-lock structure 8 and in these axial positions, the park-lock function is deactivated. The second toothed surface 7c and the toothed area 8 are in engagement with each other in the third axial position $P_{A3}$, as shown in FIGS. 3C and 6C. When the second toothed surface 7c and the toothed area 8 are in engagement with each other in the third axial position $P_{A3}$, the ring gear 2 is prevented from rotating relative to the park-lock structure 8 and in this axial position, the park-lock function is activated.

As understood from FIGS. 3A-3C and 6A-6C, the one or more protruding tooth elements 16 of the second toothed surface 7c are configured for engaging the one or more protruding tooth elements 17 of the toothed area 8a in the third axial position $P_{A3}$.

In the embodiment illustrated in FIGS. 1, 2A-2B, and 3A-3C, the park-lock structure 8 has a ring-like configuration. The park-lock structure 8 is arranged radially outside the hub structure 2a, as shown in for example FIGS. 3A-3C. In the embodiment illustrated in FIGS. 4, 5A-5B, and 6A-6C, the park-lock structure 8 has an arc-like configuration. The park-lock structure 8 is arranged radially outside the hub structure 2a, as shown in for example FIGS. 6A-6C. The park-lock structure 8 is suitably connected to a differential housing 12, or similar structure of a vehicle drivetrain. It should however be understood that the park lock structure 8 may have any suitable shape, design, and configuration for engaging the clutch sleeve 7.

The side gears 3a, 3b and the at least first differential pinion gear 4a and second differential pinion gear 4b are positioned radially inside the decoupling element 6, as shown in FIGS. 2A-2B, 3A-3C, 5A-5B, and 6A-6C. The decoupling element 6 is via the at least first differential pinion gear 4a and second differential pinion gear 4b configured for transferring input torque $T_1$ from the ring gear 2 to the first side gear 3a and second side gear 3b.

As described above, the actuating unit 9 is in engagement with the clutch sleeve 7 and suitably controlled with the control unit 13. The actuating unit 9 is adapted for displacing the clutch sleeve 7 relative to the ring gear 2 and the decoupling element 6, in the axial direction DA, between the first axial position $P_{A1}$, the second axial position $P_{A2}$, and the third axial position $P_{A3}$.

As shown in for example FIGS. 1 and 4, the differential gear unit 1 further comprises a first bearing flange 18a arranged in connection to a first side of the ring gear 2, and a second bearing flange 18b arranged in connection to a second side of the ring gear 2. The first bearing flange 18a, the second bearing flange 18b, are configured for at least partly enclosing the first side gear 3a, the second side gear 3b, the first differential pinion gear 4a, and the second differential pinion gear 4b. The bearing flanges are arranged as cover structures for keeping lubrication in place and for holding bearings. The first bearing flange 18a and the second bearing flange 18b may have any suitable configuration, and each bearing flange may be provided with one or more seals in connection to its corresponding side gear. The first bearing flange 18a and the second bearing flange 18b are suitably symmetrical in shape for a cost efficient and simple construction of the differential gear unit 1. As shown in FIG. 1, the first bearing flange 18a is arranged with a first bearing surface 19a for holding a first bearing 20a. The second bearing flange 18b is arranged with a second bearing surface 19b for holding a second bearing 20b. Each of the first bearing flange 18a and the second bearing flange 18b is suitably connected to the ring gear 2 with one or more welds or other fastening means.

To operate the differential gear unit 1, the actuating unit 9 is displacing the clutch sleeve 7 relative to the ring gear 2 and the decoupling element 6, in the axial direction DA, between the first axial position Pal, the second axial position $P_{A2}$, and the third axial position $P_{A3}$. The different axial positions may be operated in any sequence, depending on the driving conditions of the vehicle.

By displacing the clutch sleeve 7 of the illustrated embodiments in the axial direction DA to the first axial position Pal, the ring gear 2 is disconnected from the decoupling element 6, as illustrated in FIGS. 3A and 6A. The first axial position $P_{A1}$ is reached from the second axial position $P_{A2}$, or from the third axial position $P_{A3}$ via the second axial position $P_{A2}$, as understood from FIGS. 3A-3C and 6A-6C. In the first axial position Pal, rotational movement of the decoupling element 6 relative to the ring gear 2 is allowed, and thus no torque is transferred from the ring gear 2 to the differential pinion gears and the side gears due to the non-engagement of the radially protruding tooth elements 11 of the clutch sleeve 7 and the radially protruding tooth elements 15 of the decoupling element 6. The first axial position $P_{A1}$ is used during driving of the vehicle when there is no need to transfer torque from a propulsion unit, such as an internal combustion engine and/or an electric motor, to the wheels of the vehicle, for example when the vehicle is allowed to roll without any torque transfer.

By displacing the clutch sleeve 7 of the illustrated embodiments in the axial direction DA to the second axial position $P_{A2}$, the ring gear 2 is connected to the decoupling element 6, as illustrated in FIGS. 3B and 6B. The second axial position $P_{A2}$ is reached from the first axial position Pal, or from the third axial position $P_{A3}$, as understood from FIGS. 3A-3C and 6A-6C. In the second axial position $P_{A2}$, rotational movement of the decoupling element 6 relative to the ring gear 2 is prevented, and thus torque is transferred from the ring gear 2 to the differential pinion gears and the side gears due to the engagement of the radially protruding tooth elements 11 of the clutch sleeve 7 with the radially protruding tooth elements 15 of the decoupling element 6. The second axial position $P_{A2}$ is used during driving of the vehicle when there is a need to transfer torque from the propulsion unit to the wheels of the vehicle.

By displacing the clutch sleeve 7 of the illustrated embodiments in the axial direction DA to the third axial position $P_{A3}$, the ring gear 2 is connected both to the decoupling element 6 and to the park-lock structure 8, as illustrated in FIGS. 3C and 6C. The third axial position $P_{A3}$ is reached from the second axial position $P_{A2}$, or from the first axial position $P_{A1}$ via the second axial position $P_{A2}$, as understood from FIGS. 3A-3C and 6A-6C. In the third axial position $P_{A3}$, rotational movement of the decoupling element 6 relative to the ring gear 2 is prevented, and rotational movement of the ring gear 2 relative to the park-lock structure is prevented. Thus, the park-lock functionality is enabled through the engagement of the radially protruding tooth elements 11 of the clutch sleeve 7 with the radially protruding tooth elements 15 of the decoupling element 6, in combination with the engagement of the protruding tooth elements 16 of the clutch sleeve 7 with the protruding tooth elements 17 of the park-lock structure 8. In the third axial position $P_{A3}$, the ring gear 2 is connected to both the park-lock structure 8 and the decoupling element 6 for preventing rotational movement of the decoupling element 6 relative to the ring gear 2 and rotational movement of the ring gear 2 relative to the park-lock structure 8. The decoupling element 6 and the ring gear 2 are prevented from rotating relative to the park-lock structure 8 for an efficient park-locking function. The third axial position $P_{A3}$ is used during non-driving of the vehicle when there is a need to prevent the vehicle from rolling, such as when the vehicle is parked.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Differential gear unit
2: Ring gear
2a: Hub structure
2b: Internal surface
2c: External surface
3a: First side gear
3b: Second side gear
4a: First differential pinion gear
4b: Second differential pinion gear
5: Pinion pin
6: Decoupling element
6a: Outer surface
6b: Outer toothed surface
6c: Opening
7: Clutch sleeve
7a: Sleeve body
7b: First toothed surface
7c: Second toothed surface
7d: Radially inner surface
7e: Radially outer surface
8: Park-lock structure
8a: Toothed area
9: Actuating unit
10: Groove
11: Tooth elements, First toothed surface
12: Differential housing
13: Control unit
14: Inner bearing
15: Tooth elements, Outer toothed surface
16: Tooth elements, Second toothed surface
17: Tooth elements, Toothed area
18a: First bearing flange
18b: Second bearing flange
19a: First bearing surface
19b: Second bearing surface
20a First bearing
20b Second bearing
DA: Axial direction
$P_{A1}$: First axial position
$P_{A2}$: Second axial position
$P_{A3}$: Third axial position
$S_1$: First drive shaft
$S_2$: Second drive shaft
$T_1$: Input torque
$T_{O1}$: First output torque
$T_{O2}$: Second output torque

What is claimed is:

1. A differential gear unit for a vehicle, wherein the differential gear unit comprises: an annular ring gear arranged to rotate around a rotational axis extending in an axial direction; a first side gear configured for distributing a first output torque to a first drive shaft, and a second side gear configured for distributing a second output torque to a second drive shaft; at least a first differential pinion gear and a second differential pinion gear rotatably arranged on a pinion pin, wherein the at least first differential pinion gear and second differential pinion gear are configured for engaging the first side gear and the second side gear;

wherein the differential gear unit further comprises a decoupling element arranged radially inside the ring gear, the decoupling element comprising a radially outer toothed surface, wherein the decoupling element is rotatably arranged in relation to the ring gear, wherein the pinion pin is connected to and extending diametrically across the decoupling element, wherein the differential gear unit further comprises a clutch sleeve slidably arranged relative to the ring gear and the decoupling element in the axial direction, the clutch sleeve comprising a sleeve body arranged radially outside a hub structure of the ring gear, the sleeve body having a first toothed surface, the first toothed surface being arranged on a radially inner surface of the sleeve body, wherein the clutch sleeve upon displacement in the axial direction is configured for: disconnecting the ring gear from the decoupling element in a first axial position, allowing rotational movement of the decoupling element relative to the ring gear; connecting the ring gear to the decoupling element in a second axial position, preventing rotational movement of the decoupling element relative to the ring gear; and connecting the ring gear to a park-lock structure in a third axial position, and wherein the radially outer toothed surface of the decoupling element is configured for being disengaged from the first toothed surface in the first axial position and engaging the first toothed surface in the second axial position and third axial position.

2. The differential gear unit according to claim 1, wherein the clutch sleeve in the third axial position is configured for connecting the ring gear to the park-lock structure and the decoupling element, preventing rotational movement of the decoupling element relative to the ring gear and rotational movement of the ring gear relative to the park-lock structure.

3. The differential gear unit according to claim 1, wherein the ring gear comprises the hub structure, wherein the decoupling element is arranged radially inside the hub structure and rotatably arranged in relation to an internal surface of the hub structure.

4. The differential gear unit according to claim 1, wherein the sleeve body comprises a second toothed surface, wherein the second toothed surface is arranged on a radially outer surface of the sleeve body, wherein the park-lock structure comprises a toothed area configured for being disengaged from the second toothed surface in the first axial position and second axial position and engaging the second toothed surface in the third axial position.

5. The differential gear unit according to claim 1, wherein the decoupling element has a collar configuration, and wherein the clutch sleeve has a collar configuration.

6. The differential gear unit according to claim 1,
wherein the ring gear comprises the hub structure, wherein the decoupling element is arranged radially inside the hub structure and rotatably arranged in relation to an internal surface of the hub structure, and
wherein the park-lock structure has a ring or arc configuration, wherein the park-lock structure is arranged radially outside the hub structure, wherein the park-lock structure is connected to a differential housing.

7. The differential gear unit according to claim 1, wherein the first and second side gears and the at least first differential pinion gear and second differential pinion gear are positioned radially inside the decoupling element; wherein the decoupling element via the at least first differential pinion gear and second differential pinion gear is configured for transferring input torque from the ring gear to the first side gear and second side gear.

8. The differential gear unit according to claim 1, wherein the differential gear unit further comprises an actuating unit in engagement with the clutch sleeve, wherein the actuating unit is adapted for displacing the clutch sleeve relative to the ring gear and the decoupling element, in the axial direction, between the first axial position, the second axial position, and the third axial position.

9. A vehicle comprising the differential gear unit according to claim 1.

10. A differential gear unit for a vehicle, wherein the differential gear unit comprises:
an annular ring gear arranged to rotate around a rotational axis extending in an axial direction, the ring gear comprising a hub structure, the hub structure comprising one or more grooves extending in the axial direction; a first side gear configured for distributing a first output torque to a first drive shaft, and a second side gear configured for distributing a second output torque to a second drive shaft; at least a first differential pinion gear and a second differential pinion gear rotatably arranged on a pinion pin, wherein the at least first differential pinion gear and second differential pinion gear are configured for engaging the first side gear and the second side gear;
wherein the differential gear unit further comprises a decoupling element arranged radially inside the hub structure of the ring gear and rotatably arranged in relation to an internal surface of the hub structure, the decoupling element comprising a radially outer toothed surface, wherein the decoupling element is rotatably arranged in relation to the ring gear, wherein the pinion pin is connected to and extending diametrically across the decoupling element,
wherein the differential gear unit further comprises a clutch sleeve slidably arranged relative to the ring gear and the decoupling element in the axial direction, the clutch sleeve comprising a sleeve body with a first toothed surface having one or more radially protruding tooth elements, the first toothed surface being arranged on a radially inner surface of the sleeve body,
wherein the clutch sleeve upon displacement in the axial direction is configured for: disconnecting the ring gear from the decoupling element in a first axial position, allowing rotational movement of the decoupling element relative to the ring gear; connecting the ring gear to the decoupling element in a second axial position, preventing rotational movement of the decoupling element relative to the ring gear; and connecting the ring gear to a park-lock structure in a third axial position, and wherein the one or more grooves are configured for receiving the one or more radially protruding tooth elements of the first toothed surface, wherein the one or more radially protruding tooth elements of the first toothed surface are configured for preventing rotational movement of the clutch sleeve relative the hub structure through engagement with the one or more grooves,
wherein the radially outer toothed surface of the decoupling element is configured for being disengaged from the first toothed surface in the first axial position and the one or more radially protruding tooth elements of the first toothed surface are configured for engaging the radially outer toothed surface in the second axial position and third axial position.

11. The differential gear unit according to claim 10, wherein the clutch sleeve in the third axial position is configured for connecting the ring gear to the park-lock structure and the decoupling element, preventing rotational movement of the decoupling element relative to the ring gear and rotational movement of the ring gear relative to the park-lock structure.

12. A method for operating a differential gear unit for a vehicle, wherein the differential gear unit comprises: an annular ring gear arranged to rotate around a rotational axis extending in an axial direction; a first side gear configured for distributing a first output torque to a first drive shaft, and a second side gear configured for distributing a second output torque to a second drive shaft; at least a first differential pinion gear and a second differential pinion gear rotatably arranged on a pinion pin, wherein the at least first differential pinion gear and second differential pinion gear are configured for engaging the first side gear and the second side gear;
wherein the differential gear unit further comprises a decoupling element arranged radially inside the ring gear, the decoupling element comprising a radially outer toothed surface, wherein the decoupling element is rotatably arranged in relation to the ring gear, wherein the pinion pin is connected to and extending diametrically across the decoupling element,
wherein the differential gear unit further comprises a clutch sleeve slidably arranged relative to the ring gear and the decoupling element in the axial direction, the clutch sleeve comprising a sleeve body arranged radially outside a hub structure of the ring gear, the sleeve body having a first toothed surface, the first toothed surface being arranged on a radially inner surface of the sleeve body, wherein the method comprises the steps:
displacing the clutch sleeve in the axial direction to a first axial position for disconnecting the ring gear from the decoupling element, wherein in the first axial position rotational movement of the decoupling element relative to the ring gear is allowed;
displacing the clutch sleeve in the axial direction to a second axial position for connecting the first toothed surface of the clutch sleeve to the radially outer toothed surface of the decoupling element, wherein in the second axial position rotational movement of the decoupling element relative to the ring gear is prevented;
displacing the clutch sleeve in the axial direction to a third axial position for connecting the first toothed surface of the clutch sleeve to a park-lock structure.

13. The method according to claim 12, wherein the method further comprises the step: connecting the ring gear to the park-lock structure and the decoupling element with the clutch sleeve in the third axial position for preventing rotational movement of the decoupling element relative to the ring gear and rotational movement of the ring gear relative to the park-lock structure.

14. The method according to claim 12, wherein the differential gear unit further comprises an actuating unit in engagement with the clutch sleeve, wherein the method further comprises the step: displacing the clutch sleeve relative to the ring gear and the decoupling element in the axial direction with the actuating unit.

* * * * *